United States Patent [19]

Windish

[11] 4,318,283
[45] Mar. 9, 1982

[54] TORSIONAL VIBRATION DAMPER ASSEMBLY

[75] Inventor: Willis E. Windish, Pekin, Ill.

[73] Assignee: Caterpillar Tractor Co., Peoria, Ill.

[21] Appl. No.: 144,147

[22] PCT Filed: Dec. 13, 1979

[86] PCT No.: PCT/US79/01086

§ 371 Date: Dec. 13, 1979

§ 102(e) Date: Dec. 13, 1979

[87] PCT Pub. No.: WO81/01731

PCT Pub. Date: Jun. 25, 1981

[51] Int. Cl.³ .............................................. F16D 3/14
[52] U.S. Cl. ................................. 64/27 C; 64/27 F; 192/106.2
[58] Field of Search ............................ 64/27 C, 27 F; 192/106.1, 106.2, 70.17; 74/574

[56] References Cited

U.S. PATENT DOCUMENTS

| | | | |
|---|---|---|---|
| 2,065,601 | 12/1936 | Meyer | 192/106.2 |
| 3,223,214 | 12/1965 | Kuivinen | 64/27 F |
| 3,557,923 | 1/1971 | Nickell | 192/106.2 |
| 3,628,353 | 12/1971 | Armstrong | 64/27 F |
| 3,817,362 | 6/1974 | Rist | 64/27 C |
| 4,122,931 | 10/1978 | Maucher | 192/106.2 |
| 4,185,728 | 1/1980 | Gatewood | 64/27 C |
| 4,212,380 | 7/1980 | Billet | 64/27 C |
| 4,279,132 | 7/1981 | Lamarche | 64/27 C |

FOREIGN PATENT DOCUMENTS 1962963   6/1971  Fed. Rep. of Germany ...... 64/27 C

*Primary Examiner*—Tony M. Argenbright
*Assistant Examiner*—Magdalen Moy
*Attorney, Agent, or Firm*—Wegner, Stellman, McCord, Wiles & Wood

[57] ABSTRACT

A torsional vibration damping assembly including plates (14,16,18) between which is interposed friction material (30). The plates are held in an assembly and limited against motion by unthreaded reaction pins (38) supported at both ends. The friction material (30) is located radially outwardly of the usual spring assemblies (28) to increase the moment arm over which frictional forces may act. The central plate (16) has a smaller central aperture (22) than the central apertures (20,24) in the adjacent plates and is provided with spline teeth (25) having an axial length substantially no greater than the thickness of the plates (16) so as to allow a coupling (50) to be canted with respect to the rotational axis of the assembly during assembly of a transmission input shaft thereto.

4 Claims, 2 Drawing Figures

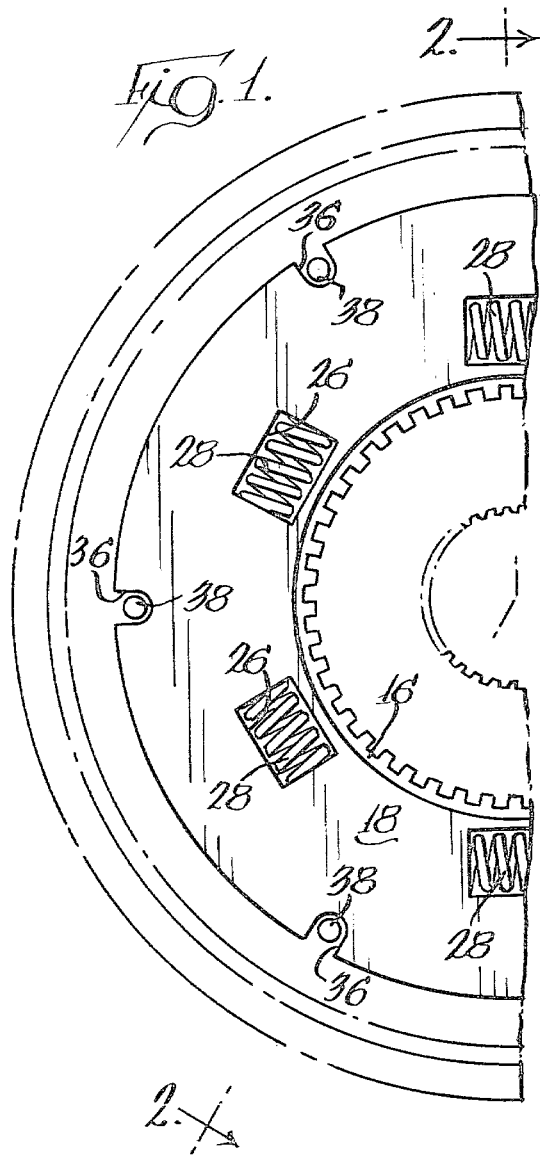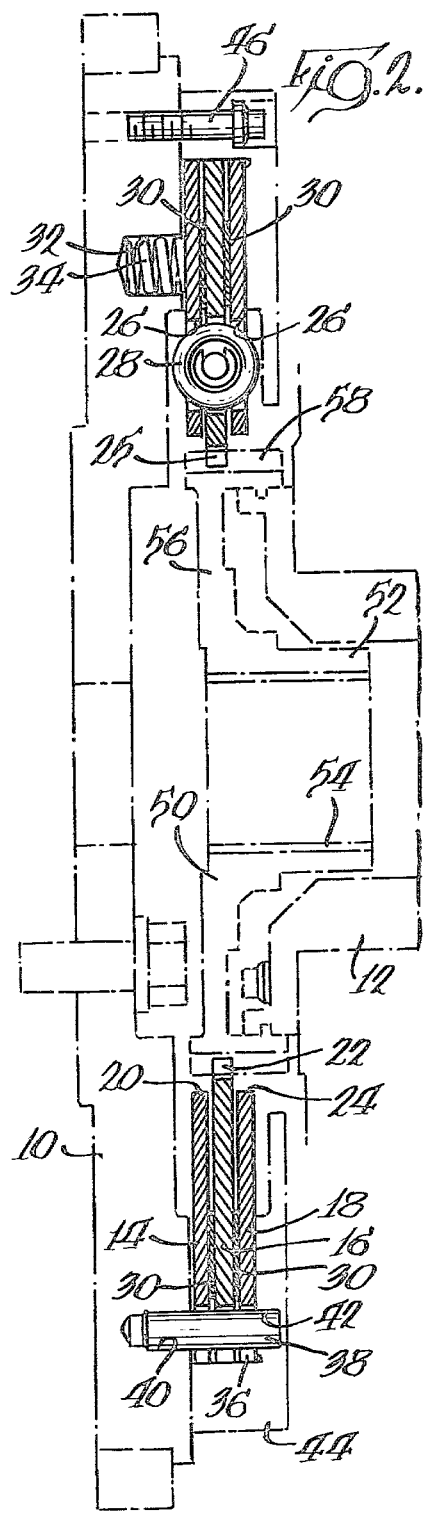

TORSIONAL VIBRATION DAMPER ASSEMBLY

DESCRIPTION

1. Technical Field

This invention relates to a torsional vibration damper assembly such as is typically interposed between the fly wheel of an engine and a transmission or torque converter.

2. Background Art

The prior art of possible relevance includes the following U.S. Pat. Nos. 2,359,180 issued Sept. 26, 1944 to Williams; 3,266,271 issued Aug. 16, 1966 to Stromberg; and 3,628,353 issued Dec. 21, 1971 to Armstrong.

Torsional vibration dampening assemblies are frequently interposed between the flywheel of an engine and a transmission for isolating and damping torsional vibrations occurring in the drive line formed thereby. A number of structures are commercially available and they typically include one or more of the features of construction illustrated in the various embodiments of the above identified Stromberg patent.

In the usual case, springs such as shown by Stromberg interconnect two or more spaced damping plates and tend to isolate drive line shock. However, because the springs also will return to the system torsional energy applied to them, it is also necessary to provide damping. This is typically achieved by utilizing friction material at the interfaces of the plates.

Heretofore, the prior art has generally located the springs at positions relatively radially outwardly of the axis of rotation of the assemblies with the friction material being located at a relatively radially inward position. As a consequence, the friction produced at the friction material upon relative movement between the plate acts over a relatively short moment arm. Damping action is thereby limited by the length of the damping arm.

At the same time, most such constructions employ an axial, splined sleeve of considerable length for connection to the transmission in the drive line with which the assembly is to be used. Because the assembly must also be secured to the flywheel, during assembly of the drive line, considerable care must be exercised in aligning the input shaft of the transmission with the splined sleeve before the two may be assembled together. When this assembly operation is attempted in confined quarters, considerable difficulty in achieving the alignment that is requisite to assembly may be encountered.

In addition, in many such assemblies, various components are held in assembled relation by threaded bolts which also serve limit relative movement between the plates. Usually, the bolts are supported only at one end with the consequence that bending forces are more difficult to resist. And because the bolts are threaded, they cannot withstand the same bending force as an unthreaded member of the same outer diameter.

DISCLOSURE OF THE INVENTION

The present invention is directed to overcoming one or more of the problems as set forth above.

According to one aspect of the invention, there is provided a vibration damping assembly composed of a plurality of plates with friction material interposed therebetween along with the usual springs. According to the invention, the same is sandwiched between a flywheel and an annular flange with the latter being secured to the flywheel. Unthreaded reaction pins are supported by both the flange and the flywheel, that is, the pins are supported at both ends, to thereby resist bending forces and thereby provide a long-lived assembly.

According to another aspect of the invention, the springs are located radially inwardly with respect to the plates forming the damping assembly while the friction material is located radially outwardly thereof. Consequently, the moment arm over which friction acts to damp vibration in the drive line is increased providing enhanced damping.

According to still another facet of the invention, the plates making up the vibration damping assembly include aligned central apertures with the central aperture of the central plate in the assembly being of smaller size that the apertures in the adjacent plates and provided with radially inwardly directed spline teeth having an axial length no greater than the thickness of the plate. Consequently, a coupling having an external spline can be connected to the central plate and be canted through substantial angles with respect thereto to facilitate alignment with the input shaft of a transmission, torque converter, or the like.

BRIEF DESCRIPTION OF DRAWINGS

FIG. 1 is a fragmentary, end view of a vibration damping assembly made according to the invention; and FIG. 2 is an enlarged sectional view taken approximately along the line 2—2 in FIG. 1 and additionally illustrating in phantom, components of a drive train with which the damping assembly is to be used.

BEST MODE FOR CARRYING OUT THE INVENTION

An exemplary embodiment of a vibration damping assembly made according to the invention is illustrated in the drawings and with reference thereto is adapted to the interposed between a flywheel 10 of an engine and the input end 12 of a transmission having a transmission shaft (not shown). The damping assembly consists of three plates 14, 16 and 18 although a greater number could be used if desired. The plates 14, 16 and 18 are generally circular in configuration and each is provided with a central aperture 20, 22 and 24 respectively. As can be seen in FIG. 2, the apertures 20 and 24 in the plates 14 and 18 have substantially the same diameter and both are considerably larger than the aperture 22 in the plate 16. Moreover, the aperture 22 includes radially inwardly directed spline teeth 25 for purposes to be seen.

In a relatively radially inward position on the plates 14, 16 and 18, all are provided with a plurality of aligned apertures 26 which receives spring assemblies 28 which may be of conventional construction. It will be observed that the springs 28 engage each of the plates 14, 16 and 18 for the usual purpose.

Radially outwardly of the apertures 26 and the springs 28, friction material 30 is interposed about the periphery of the plates at their interfaces. The friction material 30 may be bonded to the plate 16 if desired.

Axially extending bores 32 on the flywheel 10 receive compression springs 34 which bear against the plate 14 to bias the same against the plate 16 which in turn is biased against the plate 18.

About the periphery of each of the plates 14, 16 and 18, there are provided a plurality of aligned radially outwardly opening slots 36 with the slots 36 in the plate 16 being somewhat elongated to permit relative movement between the plates to allow compression of the springs 28. Axially extending reaction pins 38 extend through the slots 36 and, as seen in FIG. 2, each such pin 38 has one end received in a bore 40 in the flywheel 10 and an opposite end received in a bore 42 formed in an annular flange 44 secured to the flywheel 10 by a series of bolts 46 (only one of which is shown). As a consequence, the pack defined by the plates (14,16 and 18) is sandwiched between the flange 44 and the flywheel 10. Relative movement, to a limited degree, between the plates 14, 16, and 18 can occur by reason of the fact that the slots 36 are formed to be somewhat larger than the pins 38 as shown in FIG. 1. The sides of the slots 36 do, however, limit relative movement between the plates 14, 16 and 18 as is well known. Because the plates 14 and 18 are in direct contact with driving components, the flywheel 10 and the flange 44, respectively, they constitute the driving plates in the assembly. The central plate 16 constitutes a driven plate being driven by friction provided by the friction material 30, forces generated in the springs 28 and/or abutment with the reaction pins 38 when maximum spring deflection has occurred. The plate 16, is therefore, the one to be coupled to the input shaft of the transmission or the like. To facilitate such coupling, there is provided a coupling 50 having a sleeve-like body 52 provided with an internal spline 54 which may receive a mating external spline on the input shaft (not shown) of the transmission. One end of the body 52 is provided with a peripheral, radially outwardly directed web 56 which terminates in a peripheral, external spline 58 which is engaged with the spline teeth 25 on the plate 16. The spline 58 is also spaced from the bounds of the apertures 20 and 24 and the plates 14 and 18.

It will be observed that the internal spline defined by the spline teeth 25 have an axial length equal to the thickness of the plate 16. For purposes to be seen, this axial length should be substantially no greater than the thickness of the plate 16.

Industrial Applicability

During installation, alignment of the transmission with the damping assembly is easily achieved. The short axial length of the spline 25 allows the coupling 50 to be canted at substantial angles with respect to the rotational axis of the drive line. There is, therefore, no need to bring the input shaft of the transmission into precise axial alignment with the rotational axis of the flywheel and then axially advance the shaft into a spline coupling as is the case with prior art structures. This type of prior art assembly technique requires a great deal of space. Rather, one may pivot the coupling 50 to a substantial angle with respect to the rotational axis of the flywheel and insert the transmission input shaft into the spline 54. The transmission may then be pivoted, in a far lesser space, into the required axial alignment. Consequently, the assembly of the present invention reduces spacial requirements required for assembly and thereby minimizes the time required for assembly in many instances.

The use of unthreaded reaction pins such as the pins 38 which are supported at both ends by the flywheel 10 and the flange 44, respectively, reduces bending forces applied thereto when one or more of the plates has a side of its slots 36 in contact therewith. The fact that the pins 38 are unthreaded increases their strength while dual end support provides increased support against bending.

Finally, the location of the friction material 30 at locations radially outwardly of the spring assemblies 28 increases, by substantial amount, the moment arm over which frictional forces may operate to provide enhanced damping.

I claim:

1. A vibration damping assembly adapted to be interposed between an engine flywheel (10) and a transmission (12) or the like comprising:
    at least three plates (14,15,18) in side by side relation;
    friction material (30) at the interface of said plates;
    aligned holes (26) in said plates;
    spring assemblies (28) in said holes and engaging each of said plates;
    means (34) biasing said plates and said friction material into a pack;
    means (38,44,46) holding said pack in assembled relation and limiting relative movement of said plates; and
    aligned central apertures (20,22,24) in said plates, the central plate (16) in said pack having its central aperture (22) smaller than the central aperture of the adjacent plates and provided with radially inwardly directed splines (24) having an axial length substantially no greater than the thickness of said central plate for slidably receiving mating splines on a shaft, coupling, or the like.

2. The vibration damping assembly of claim 1 in combination with a coupling (50) having a sleeve (52) like body having an internal spline (54), a radially outwardly directed web (56) adjacent one end of the sleeve, and external, radially outwardly directed spline (58), about the radially outer periphery of the web in engagement with the spline on said central plate and spaced from the central apertures (20,24) on said adjacent plates.

3. A vibration damping flywheel assembly adapted to be connected to a transmission (12) or the like comprising:
    at least three plates (14,16,18) in side by side relation;
    friction material (30) at the interfaces of said plates at radially outer locations thereon;
    aligned holes (26) in said plates at radially inner locations thereon;
    spring assemblies (28) in said holes and engaging each of said plates;
    means biasing (32) said plates and said friction material into a pack;
    means (38,44,46) holding said pack in assembled relation and limiting relative movement of said plates;
    aligned central apertures (20,22,24) in said plates;
    means (24) in at least one central aperture for coupling said assembly to a shaft;
    a flywheel (10);
    said pack being abutted against one side of said flywheel in axial alignment therewith;
    said holding and limiting means including an annular flange (44) secured to said flywheel and abutting one of said plates (18) thereby sandwiching said pack thereagainst; and
    a plurality of unthreaded reaction pins (38) extending through enlarged, aligned slots (36) in said plates and having opposed ends received in aligned bores (40,42) in said flywheel and said flange.

4. A vibration damping assembly adapted to be interposed between an engine flywheel (10) and a transmission (12) or the like comprising:

at least three plates (14,16,18) in side by side relation;
friction material (30) at the interfaces of said plates at radially outer locations thereon;
aligned holes (26) in said plates at radially inner locations thereon;
spring assemblies (28) in said holes and engaging each of said plates;
means (34) biasing said plates and said friction material into a pack;
means (38,44,46) holding said pack in assembled relation and limiting relative movement of said plates; and
aligned central apertures (20,22,24) in said plates, the central plate (16) in said pack having its central aperture (22) smaller than the central aperture (20,24) of the adjacent plates and provided with radially inwardly directed splines (25) having an axial length substantially no greater than the thickness of said central plates for slidably receiving mating splines on a shaft, coupling, or the like.

* * * * *